(No Model.) 2 Sheets—Sheet 1.
B. H. FISHER.
DYNAMO REGULATOR.
No. 449,245. Patented Mar. 31, 1891.
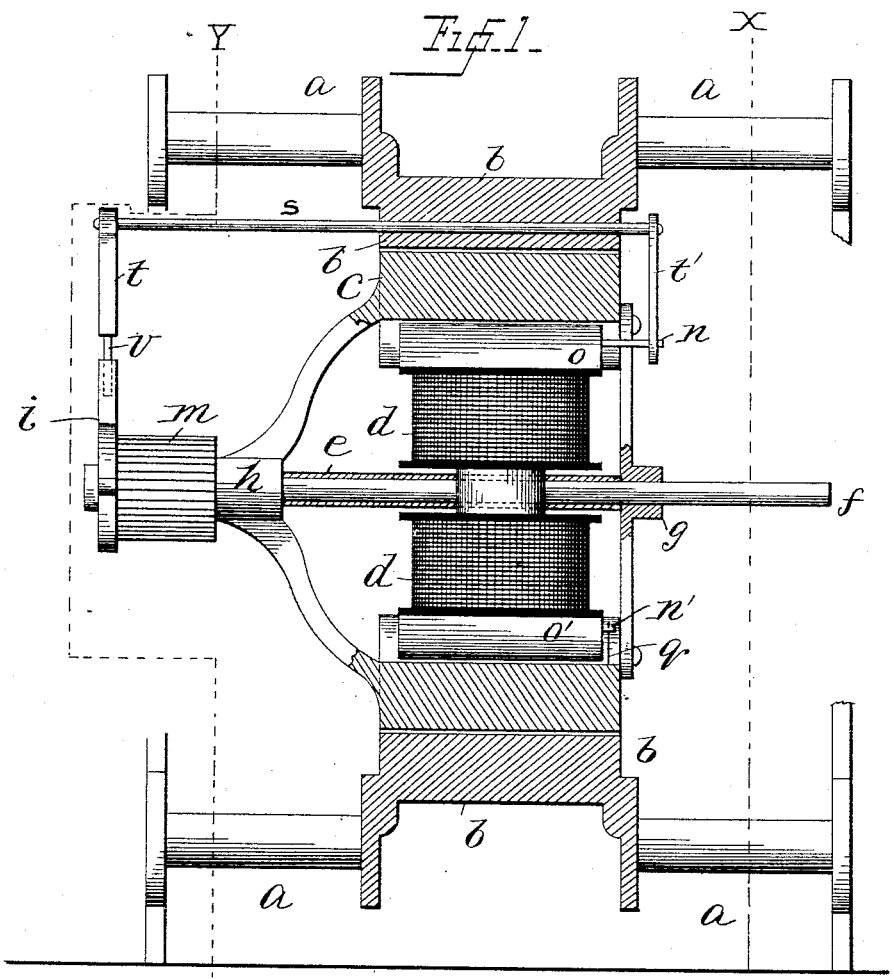
Witnesses
Will A. Courtland
Nellie L. Pope
Inventor
BURNETT H. FISHER
BY HIS ATTORNEY
Edward P. Thompson (No Model.) 2 Sheets—Sheet 2.
B. H. FISHER.
DYNAMO REGULATOR.
No. 449,245. Patented Mar. 31, 1891.
*Fig. 2.*      *Fig. 3.*
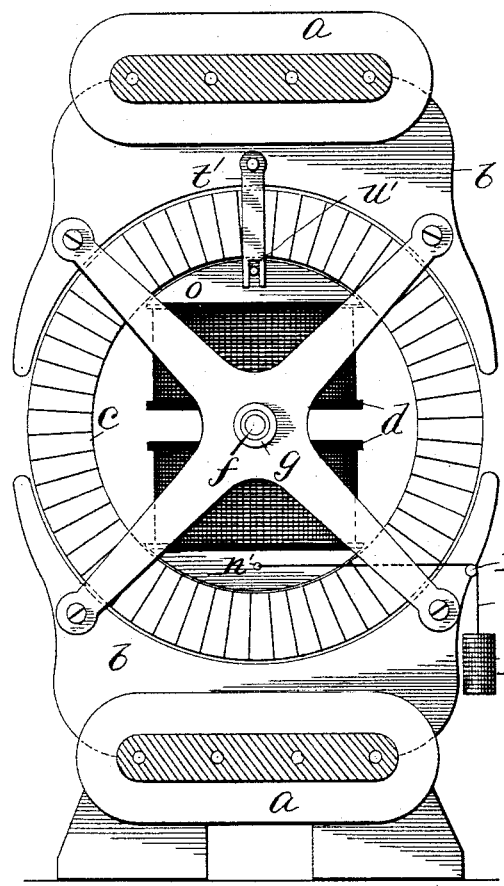
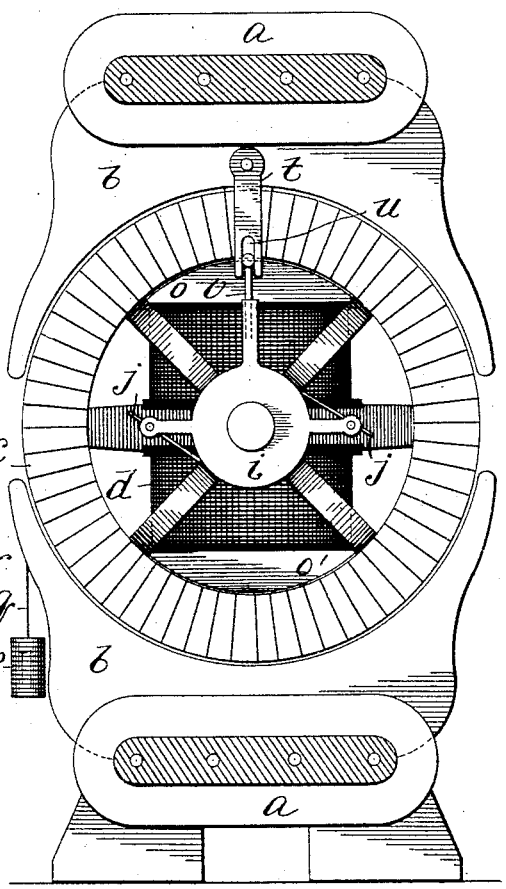
Witnesses
Will A. Courtland
Nellie L. Pope
Inventor
BURNETT H. FISHER
BY HIS ATTORNEY
Edward P. Thompson

UNITED STATES PATENT OFFICE.

BURNETT H. FISHER, OF NEW YORK, N. Y.

DYNAMO-REGULATOR.

SPECIFICATION forming part of Letters Patent No. 449,245, dated March 31, 1891.

Application filed September 15, 1890. Serial No. 365,077. (No model.)

*To all whom it may concern:*

Be it known that I, BURNETT H. FISHER, a citizen of the United States, and a resident of New York, county and State of New York, have invented certain new and useful Improvements in Dynamo-Regulators, of which the following is a specification.

My invention relates to a self-regulating dynamo.

The object of the invention is to provide a dynamo in which the brushes are automatically adjusted to the proper position for least sparking and waste of current, and whereby the motion for adjusting the brushes is obtained from that of one of the field-magnets. The object is also to accomplish improved mechanical construction.

The invention in all its details is illustrated in the accompanying drawings, in which—

Figure 1 is a vertical and partial sectional view of the dynamo in the direction of the length of the shaft. The internal field-magnet is not shown in section, neither is the shaft nor commutator. Fig. 2 is a similar view to Fig. 1, except that the plane of section is perpendicular to the shaft at the line X in Fig. 1. Fig. 3 is a similar view to Fig. 2, except that the section follows the line Y in Fig. 1.

The device embodying the invention consists of the combination of field-magnets $a$, having consequent pole-pieces $b$, between which is a ring-armature $c$; an internal field-magnet $d$, fixed to the tube $e$, loose upon the armature-shaft $f$, and located between the bearings $g$ and armature-hub $h$; a brush-holder $i$, carrying the brushes $j$ for the commutator $m$, and mechanism, hereinafter described, connecting the said brush-holder to the field-magnet $d$.

$n$ is a pin projecting from the pole-piece $o$ of the internal field-magnet $d$, and $n'$ is a second pin projecting from the lower pole-piece $o'$ of the same field-magnet. The pin $n'$ is attached to a variable weight $p$ by means of a string $q$, passing over a pulley $r$. The variable weight $p$ consists of several detachable small weights supported upon the string $q$.

$s$ is an arbor passing loosely through the upper pole-piece $b$, and having upon opposite ends fixed cranks $t$ and $t'$, provided with longitudinal slots $u$ and $u'$. The pin $n$ projects into the slot $u'$, and the adjustable pin $v$ projects into the slot $u$. The said pin $v$ screws into the brush-holder $i$ to a distance depending upon how much motion of the latter is required for a given motion of the crank $t$.

The operation of the device is as follows: When the "neutral line" changes, the internal field-magnet will change its position relatively to the external field-magnet. This change of position will turn the crank $t'$ slightly, and thereby, also, the brush-holder $i$. If the pin $v$ is once adjusted so that the brushes touch the commutator at the neutral line, then any change of relative position of the internal field-magnet $d$ will cause automatically such an adjustment of the brushes that they will continue to remain on the neutral line substantially. The amount of weight $p$ required may be easily determined by putting on the maximum and then gradually taking them off until the machine runs satisfactorily with variable load. The weight $p$ should pull in such a direction as to oppose the magnetic attraction.

I claim as my invention—

1. A dynamo consisting of the combination of stationary and movable field-magnets, commutator-brushes, and means for communicating motion from the movable field-magnet to the said brushes.

2. A dynamo consisting of the combination of stationary and movable field-magnets, commutator-brushes, and means for communicating motion from the movable field-magnet to the said brushes, said means consisting of an arbor engaging both with the movable field-magnet and with the said brushes.

3. A dynamo consisting of the combination of stationary and movable field-magnets, commutator-brushes, and means for communicating motion from the movable field-magnets to the said brushes, said means consisting of an arbor engaging both with the movable field-magnet and with the said brushes and passing through a pole-piece of the stationary magnet.

4. A dynamo consisting of the combination of stationary field-magnets having pole-pieces, a ring-armature between and in inductive relation to said pole-pieces, an internal field-magnet loose upon the armature-shaft, pins projecting from the pole-pieces of the said internal field-magnet and connected, respectively, with a suspended weight, and an arbor which has a crank engaging with the brushes of the motor.

In testimony that I claim the foregoing as my invention I have signed my name, in presence of two witnesses, this 13th day of September, 1890.

BURNETT H. FISHER.

Witnesses:
EDWARD P. THOMPSON,
E. G. DUVALL, Jr.